(12) United States Patent
Nishizawa et al.

(10) Patent No.: US 10,297,165 B2
(45) Date of Patent: *May 21, 2019

(54) EDUCATION SUPPORT SYSTEM AND TERMINAL DEVICE

(71) Applicant: SHINANO KENSHI KABUSHIKI KAISHA, Nagano (JP)

(72) Inventors: Tatsuo Nishizawa, Nagano (JP); Yusuke Tashiro, Nagano (JP)

(73) Assignee: SHINANO KENSHI KABUSHIKI KAISHA, Nagano (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/548,051

(22) PCT Filed: Mar. 16, 2016

(86) PCT No.: PCT/JP2016/058289
§ 371 (c)(1),
(2) Date: Aug. 1, 2017

(87) PCT Pub. No.: WO2016/174951
PCT Pub. Date: Nov. 3, 2016

(65) Prior Publication Data
US 2018/0040254 A1 Feb. 8, 2018

(30) Foreign Application Priority Data

Apr. 30, 2015 (JP) .................................. 2015-093668

(51) Int. Cl.
*G09B 5/06* (2006.01)
*G11B 20/10* (2006.01)
(Continued)

(52) U.S. Cl.
CPC ............. *G09B 5/06* (2013.01); *G09B 21/006* (2013.01); *G09B 21/008* (2013.01); *G10L 13/02* (2013.01); *G11B 20/10* (2013.01); *G11B 27/36* (2013.01)

(58) Field of Classification Search
USPC .................................................. 704/270–271
See application file for complete search history.

(56) References Cited

U.S. PATENT DOCUMENTS 5,884,250 A * 3/1999 Ono .................... H04M 1/6505
704/201
2005/0191604 A1 9/2005 Allen
(Continued)

FOREIGN PATENT DOCUMENTS

| JP | 2000057752 | 2/2000 |
| JP | 2004061788 | 2/2004 |
| JP | 2014089443 | 5/2014 |

OTHER PUBLICATIONS

International Search Report for PCT/JP2016/058289, dated Jun. 14, 2016.
(Continued)

*Primary Examiner* — Leonard Saint Cyr
(74) *Attorney, Agent, or Firm* — Stephen J. Weyer, Esq.; Stites & Harbison, PLLC

(57) ABSTRACT

To provide an education support system that allows educators to conduct adequate assessments considering handicaps or characteristics of individual students and to offer effective and efficient learning. Solving means includes: a plurality of terminal devices (40) including: a terminal display unit (41) that displays digital content; a voice output unit (47) that outputs voice data by voice; a reproduction log data memory unit (46) that memorizes ID information of phrases and phrase reproduction start times as reproduction log data; and a transmitter unit (42) that transmits the reproduction log
(Continued)

data; and a server device (30) including: a digital content memory unit (60) in which digital content is memorized; a receiver unit (62) that receives reproduction log data from the respective terminal devices (40); a data conversion unit (64) that converts the received reproduction log data into times spent on reproduction and numbers of times of reproduction by phrase; a server display unit (63) that displays the times spent on reproduction and numbers of times of reproduction by phrase; and a display control unit (64) that causes the server display unit to display a plurality of sets of the times spent on reproduction and numbers of times of reproduction by phrase at different times and dates in the same terminal device and for the same digital content simultaneously on a same screen.

2 Claims, 7 Drawing Sheets

(51) Int. Cl.
  *G09B 21/00* (2006.01)
  *G10L 13/02* (2013.01)
  *G11B 27/36* (2006.01)

(56) References Cited

U.S. PATENT DOCUMENTS

| | | | | |
|---|---|---|---|---|
| 2008/0065248 | A1* | 3/2008 | Araki | G10H 1/0033 700/94 |
| 2008/0267587 | A1* | 10/2008 | Kang | G11B 27/10 386/244 |
| 2010/0070263 | A1* | 3/2010 | Goto | G06F 17/30746 704/8 |
| 2013/0311178 | A1* | 11/2013 | Lee | G10L 15/26 704/235 |
| 2013/0311186 | A1* | 11/2013 | Lee | G10L 15/26 704/260 |

OTHER PUBLICATIONS

Junko Amano, "A Learning Support System for Children with Difficulties in Reading and Writing", IEICE Technical Report, Sep. 10, 2004 (Sep. 10, 2004), vol. 104, No. 314, pp. 7 to 12.

* cited by examiner

FIG.3
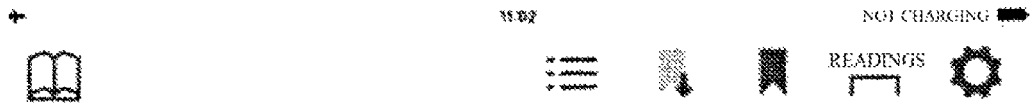
"SO,SO, NAH, KASUKE", SAID HYOJU.
"AAN?"
"OREA, KONOGORO,
　TOTEMOHUSHIGINAKOTOGAARUNDA"
"NANIGA?"
"OKKAAGASHINDEKARAWA, DAREDAKASHIRANGA,
　ORENIKURIYAMATSUTAKENANKAWO,
　MAINICHIMAINICHIKURERUNDAYO"
"HUUN, DAREGA?"
"SOREGAWAKARANNODAYO. ORENOSHIRANUCHINI,
　OITEIKUNDA"
GON FOLLOWED THESE TWO.
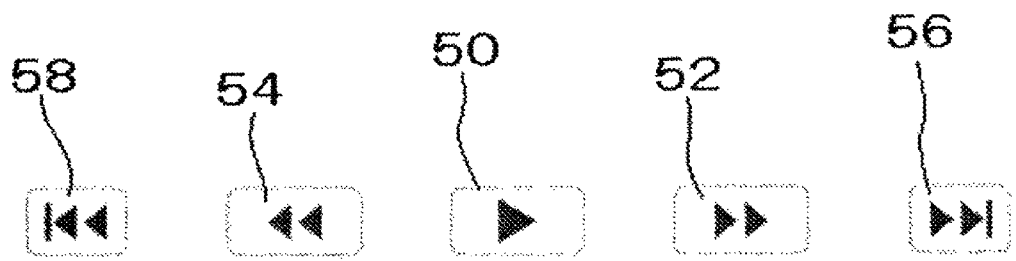

FIG. 5  *REPR = REPRODUCTION

| TIMES AND DATES | OPERATION | STATE | TITLE | REPR FILE | PHRASE ID | TEXT OF CORRESPONDING PHRASE |
|---|---|---|---|---|---|---|
| 2015/2/4/ 10:7:15.842 | START | | | | | |
| 2015/2/4/ 10:7:18.975 | TOP TITLE | | gonM | 00.html | | |
| 2015/2/4/ 10:7:20.976 | REPR BUTTON | | gonM | 00.html | rpu_0001 | GONGITSUNE |
| 2015/2/4/ 10:7:21.899 | STOP BUTTON | | gonM | 00.html | rpu_0001 | GONGITSUNE |
| 2015/2/4/ 10:7:23.926 | SET | REPR SPEED | gonM | 00.html | rpu_0001 | GONGITSUNE |
| 2015/2/4/ 10:7:29.116 | REPR BUTTON | | gonM | 00.html | rpu_0001 | GONGITSUNE |
| 2015/2/4/ 10:7:31.499 | | REPR | gonM | 00.html | xrip_0001 | NIMINANKICHI |
| 2015/2/4/ 10:7:33.189 | | REPR | gonM | 00.html | rpu_0003 | |
| 2015/2/4/ 10:7:33.619 | | REPR | gonM | 01.html | rpu_0004 | |
| 2015/2/4/ 10:7:35.818 | | REPR | gonM | 01.html | xrip_0002 | KOREWA, WATASHIGACHIISAITOKINI |
| 2015/2/4/ 10:7:44.443 | | REPR | gonM | 01.html | rpu_0003 | MUKASHIWA, WATASHITACHINOMURANOCHIKAKUNO |
| 2015/2/4/ 10:7:48.597 | STOP BUTTON | REPR | gonM | 01.html | rpu_0003 | MUKASHIWA, WATASHITACHINOMURANOCHIKAKUNO |
| 2015/2/4/ 10:7:51.284 | SET | REPR SPEED | gonM | 01.html | xrip_0003 | MUKASHIWA, WATASHITACHINOMURANOCHIKAKUNO |
| 2015/2/4/ 10:7:53.095 | REPR BUTTON | | gonM | 00.html | rpu_0001 | GONGITSUNE |
| 2015/2/4/ 10:7:58.290 | TOP TITLE | | gonM | 00.html | rpu_0001 | NIMINANKICHI |
| 2015/2/4/ 10:8:1.593 | | REPR | gonM | 00.html | rpu_0001 | |
| 2015/2/4/ 10:8:3.790 | | REPR | gonM | 00.html | rpu_0003 | |
| 2015/2/4/ 10:8:3.918 | | REPR | gonM | 01.html | rpu_0004 | |
| 2015/2/4/ 10:8:5.810 | | REPR | gonM | 01.html | xrip_0002 | KOREWA, WATASHIGACHIISAITOKINI |
| 2015/2/4/ 10:8:15.427 | | REPR | gonM | 01.html | rpu_0003 | MUKASHIWA, WATASHITACHINOMURANOCHIKAKUNO |
| 2015/2/4/ 10:8:28.571 | | REPR | gonM | 01.html | rpu_0004 | "GONGITSUNETOIUKITSUNEGAIMASHITA. |
| 2015/2/4/ 10:8:38.287 | | REPR | gonM | 01.html | xrip_0005 | GONWA, HITORIBOCCHINOKOGITSUNEDE |
| 2015/2/4/ 10:8:38.933 | STOP BUTTON | | gonM | 01.html | xrip_0005 | GONWA, HITORIBOCCHINOKOGITSUNEDE |
| 2015/2/4/ 10:8:41.368 | SET | REPR SPEED | gonM | 01.html | xrip_0005 | |
| 2015/2/4/ 10:8:45.536 | REPR BUTTON | REPR | gonM | 01.html | xrip_0005 | GONWA, HITORIBOCCHINOKOGITSUNEDE |
| 2015/2/4/ 10:8:57.908 | STOP BUTTON | | gonM | 01.html | xrip_0006 | SOSHITE, YORUDEMOHIRUDEMO |
| 2015/2/4/ 10:8:59.029 | STOP BUTTON | | gonM | 01.html | xrip_0006 | SOSHITE, YORUDEMOHIRUDEMO |
| 2015/2/4/ 10:9:15.121 | END | | gonM | | | |

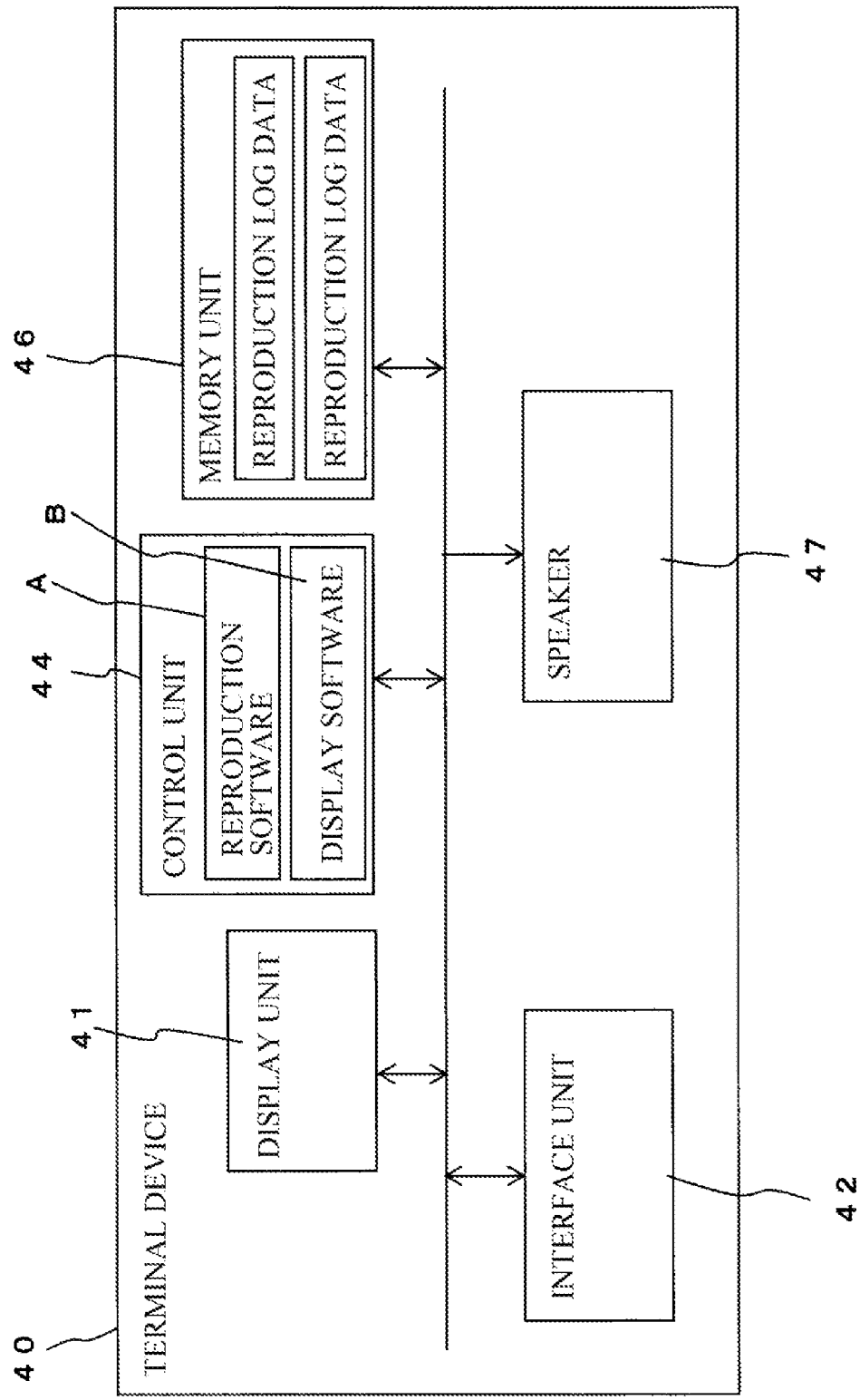

EDUCATION SUPPORT SYSTEM AND TERMINAL DEVICE

TECHNICAL FIELD

The present invention relates to an education support system based on digital content and terminal devices of the education support system.

BACKGROUND ART

An apparatus that reproduces electronic books memorized as electronic data in advance as a voice is known in the related art (For example, see PTL1). The apparatus disclosed in PTL1 is an apparatus that reproduces digital content based on DAISY (Digital Accessible Information System) standard, and is an apparatus that is able to read out text information in books by voice so that visually impaired people can enjoy reading.

In reproduction of the digital content as described above, e-learning is now spreading in association with improvement of network environment in these years (For example, see PTL2).

An exemplary method of utilization of the e-learning includes distributing the digital content to students via the e-learning and allowing the individual students to operate the respective terminals to reproduce learning digital content.

CITATION LIST

Patent Literature

PTL1: JP-A-2000-057752
PTL2: JP-A-2004-61788

SUMMARY OF INVENTION

Technical Problem

In a case where students reproduce a learning digital content to learn, educator side who educates the students need to figure out and control progress statuses of learning.

In a system in which the learning digital content is electronic books based on DAISY standard, and the students reproduce the electronic books to cause terminals to read out the electronic books, there is a case where target students may have a difficulty in reading. In such a case, there is a problem that comprehension levels and achievement levels are significantly different depending on students who have difficulty in reading, so that adequate assessments for individual students are difficult for the educator side.

Solution to Problem

Accordingly, in order to solve the above-described problem, it is an object of the present invention to provide an education support system that allows educators to conduct adequate assessments considering handicaps or characteristics of individual students and to offer effective and efficient learning.

An education support system of the present invention includes: one or more terminal devices including a terminal display unit that displays text data of a digital content including text data and voice data created by reading out the text data, a voice output unit that outputs the voice data of the digital content by voice, a reproduction log data memory unit that memorizes at least ID information on phrases of the digital content reproduced by the terminal display unit and the voice output unit and reproduction start times of the phrases for each of the phrases as reproduction log data, and a transmission unit configured to transmit the reproduction log data memorized in the reproduction log data memory unit; and a server device including: a digital content memory unit in which one or more digital content to be distributed to each of the terminal devices are memorized, a receiver unit that receives the reproduction log data transmitted from each of the terminal devices, a data conversion unit that converts the reproduction log data of each of the terminal devices received by the receiver unit into times spent on reproduction and numbers of times of reproduction by phrase of the digital content, a server display unit that displays the times spent on reproduction and numbers of times of reproduction by phrase of the digital content converted by the data conversion unit, and a display control unit that causes the server display unit to display a plurality of sets of times spent on reproduction and numbers of times of reproduction by phrase at different time and date on the same terminal device for the same digital content simultaneously on the same screen.

By employing this configuration, the reproduction log data of the digital content reproduced by the terminal devices is accumulated in the server device, and states of reproduction of the same digital content by the same person at different time and date may be displayed on one screen, so that medium term or long term tutorship and support for comprehension levels and achievement levels of students are achieved.

Also, the display control unit may be configured to arrange strings of the phrases in the respective digital content in a vertical direction, indicate times spent on reproduction of the strings of the phrases by a lateral length of squares arranged on a right side of the respective strings arranged in the vertical direction, and control the lateral length of the squares to be displayed by different colors for each of reproduction times and dates.

In this configuration, comprehension levels and achievement levels of target students may be easily figured out visually along with reproduction times and dates.

Also, the display control unit may be configured to control display so as to allow discrimination between reproduction with a voice output and reproduction without the voice output when indicating the times spent on reproduction of the strings of the phrases by the lateral length of the squares shown on the right side of the respective strings arranged in the vertical direction.

Generally, in a case where time spent on reproduction with the voice output is not much different from time spent on reproduction without the voice output, the comprehension level and achievement level of the corresponding student are considered to have been improved. By employing the configuration described above, comprehension levels and achievement levels of the students may be figured out easily from an overall consideration about presence or absence of the voice output and the time spent on reproduction.

The terminal device according to the present invention includes: a display unit that displays text data of a digital content including text data and voice data created by reading out the text data, a voice output unit that outputs the voice data of the digital content by voice, a reproduction log data memory unit that memorizes at least ID information on phrases of the digital content reproduced by the terminal display unit and the voice output unit and reproduction start times of the phrases for each of the phrases as reproduction log data, a data conversion unit that converts the reproduction log data of the reproduction log data memory unit into times spent on reproduction and numbers of times of reproduction by phrase of the digital content, and a display control unit that arranges strings of phrases in the reproduction log data converted by the data conversion unit in the vertical direction, and causes the times spent on reproduction of the strings of the phrases to be displayed with the times spent on reproduction and numbers of times of reproduction by phrase at different times and dates so as to be indicated by a lateral length of squares shown on the right side of the respective strings simultaneously on the same screen.

By employing the configuration described above, the students can figure out their own comprehension levels and achievement levels in a medium term or long term learning.

Advantageous Effects of Invention

According to the present invention, an education support system and a terminal device capable of achieving medium term or long term tutorship and support for comprehension levels and achievement levels of students are provided.

BRIEF DESCRIPTION OF DRAWINGS

FIG. 3 is an explanatory drawing illustrating a display unit of the terminal device.

FIG. 5 is an explanatory drawing illustrating an example of reproduction log data.

FIG. 7 is a block diagram illustrating another configuration of the terminal device.

DESCRIPTION OF EMBODIMENTS

Figure 1:
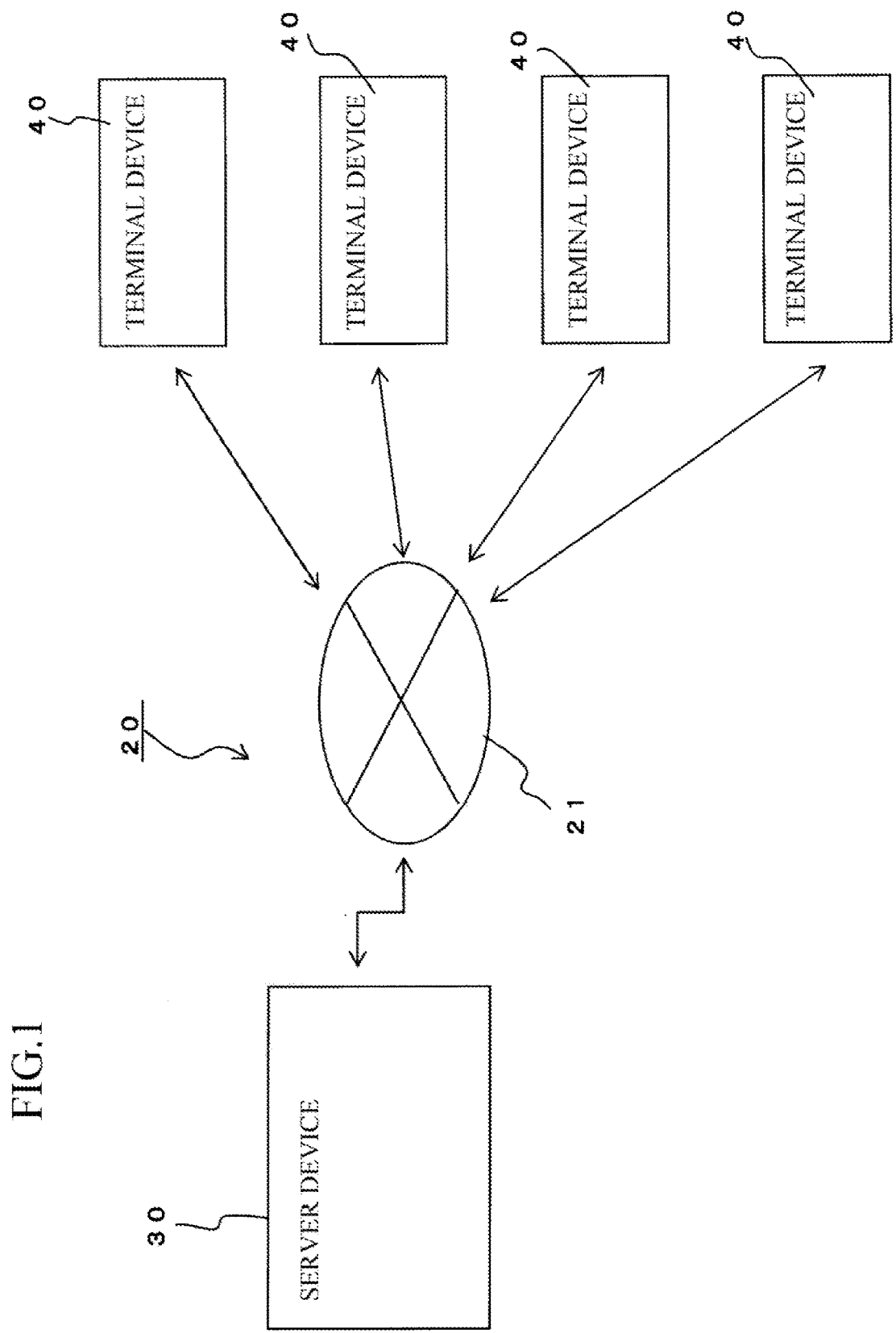
FIG. 1 is an explanatory drawing illustrating a general configuration of an education support system of the present invention.

A general configuration of the education support system according to the present invention is illustrated in FIG. 1.

An education support system 20 includes one or more server devices 30 and one or more terminal devices 40. In FIG. 1, a state in which a plurality of the terminal devices 40 are connected to one server device 30 via a network 21 such as the internet is illustrated.

The education support system 20 is a system in which individual students have at least one terminal device 40, and the respective students download a learning digital content from the server device 30 to the respective terminal devices 40, and view and listen to the learning digital content. As the learning digital content, electronic books based on DAISY standard are employed. The student operates the terminal device 40 and reproduce the learning digital content, so that text parts of the learning digital content are displayed on the terminal device, and the terminal device operates to read out voice data corresponding to the displayed text parts.

The server device 30 is configured to allow educators or teachers of the students, that is, persons who are in charge of managing the student to operate.

Figure 2:
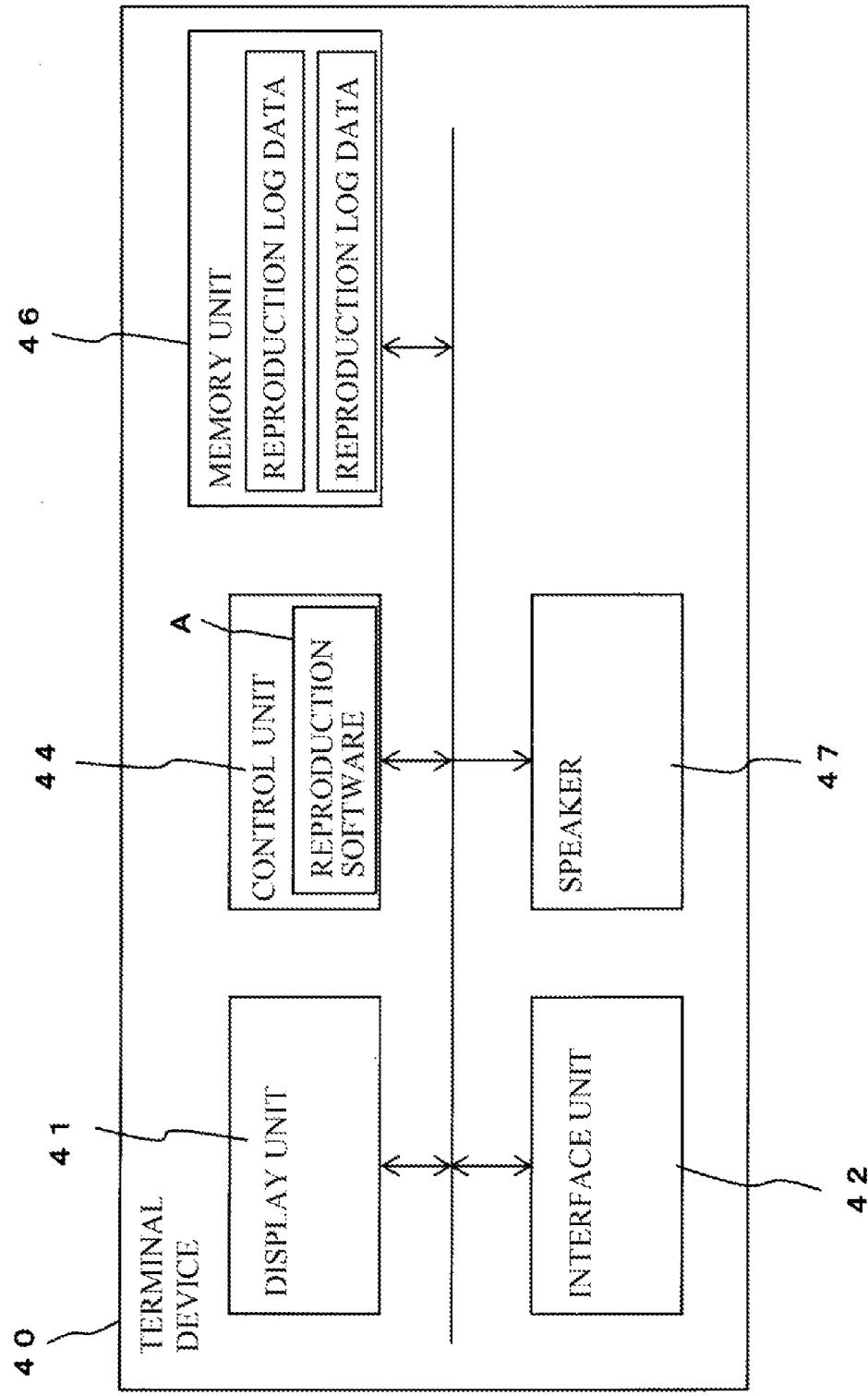
FIG. 2 is a block diagram illustrating an internal configuration of a terminal device.

The terminal device 40 will be described based on FIG. 2 illustrating a configuration of the terminal device 40.

The terminal device 40 may employ a tablet terminal (slate type PC), which is a mobile terminal which can be connected to the internet.

The terminal device 40 includes a display unit 41 that employs a touch panel, an interface unit 42 for connecting to the internet, a control unit 44 including a CPU, a memory, and the like, and a speaker 47 that outputs voice. The above-described display unit 41 corresponds to a terminal display unit in claims. The above-described speaker 47 corresponds to a voice output unit in claims.

The terminal device 40 includes reproduction software that reproduces a digital content memorized in the server device 30. The reproduction software is composed of a program having a function that can reproduce (including streaming reproduction which reproduces while downloading) the digital content downloaded from the server device 30. A reproduction software A is memorized in a memory unit 46 such as a semiconductor memory, and reproduction of the digital content is achieved by the control unit 44 reading out the reproduction software A and executing the same.

The digital content in this embodiment is assumed to be electronic books. Examples of representative standards of the electronic books include DAISY standard for digital recorded books.

The electronic book data of the DAYSY standard include smil (Synchronized Multimedia Integration Language) file, an ncc file or an ncx file in which title information is described, an html file or an xml file in which text data which can be displayed on the display unit 41 is described, and a voice data file in which the text data is read out.

The smil file is a sort of markup language, in which the order of display of the respective phrases in the html file or the xml file, and reproduction starting and ending times of the voice data file corresponding to the respective phrases are described.

In the terminal device 40, when the control unit 44 executes the reproduction software A, the text data is displayed on the display unit 41 for each phrase of predetermined digital content. When an operator (student) of the terminal device taps the play button 50 described later, a voice data file of a portion corresponding to the text data displayed on the display unit 41 is synchronized with the text data, and a voice is output from the speaker 47.

In association with the execution of the reproduction software A, a screen as illustrated in FIG. 3, for example, is displayed on the display unit 41 of the terminal device 40.

In the example illustrated in this drawing, part of a text in a digital content is displayed from a right to a left direction. Under the text, the play button 50, a fast-forward button 52, a rewind button 54, a next page button 56, and a front page button 58 are displayed.

As the display unit 41 is a touch panel, when the operator (student) taps any above-described one of the play button 50, the fast-forward button 52, the rewind button 54, the next page button 56, and the front page button 58, or directly taps the phrase desired to listen, the reproduction software A executes the respective operations.

For example, when the operator (student) taps the play button 50, the reproduction software A reproduces a voice data file corresponding to the text displayed on the display unit 41.

When reproduction of the voice data file is terminated, the operator (student) may reproduce the same phrase again by tapping the rewind button 54 if comprehension is not sufficient.

In order to proceed the next page, tapping the next page button 56 causes the reproduction software to display a text of a next phrase on the display unit 41.

When reproduction of the voice data file is performed, ID information and reproduction start time of the phrase for each phrase are memorized in the memory unit 46 as reproduction log data. In addition, examples of the reproduction log data also include data including time and date, operation information operated on the terminal device 40 (operation of the play button and the stop button), reproduction information (content of the phrase), and set value change information from the server device 30.

The reproduction software also covers pinch-in and pinch-out operations. When the operator (student) performs the pinch-in operation, the reproduction software reduces respective characters displayed on the display unit 41 to display a larger number of characters. Therefore, the number of characters to be displayed in one screen is increased.

In contrast, when the operator (student) performs the pinch-out operation, the reproduction software enlarges the respective characters displayed on the display unit 41 and reduces the displayed number of characters. Therefore, the number of characters displayed in one screen is reduced.

Although a reproduction time per screen changes as well in association with the pinch-in or the pinch-out operation, the pinch-in or the pinch-out operation may also be recorded as the reproduction log data by memorizing the first phrase and the last phrase displayed in the screen as a log together with the reproduction time in one phrase unit. In the same manner, a scrolling operation may also be recorded.

After reproduction of one learning digital content has been terminated, all the reproduction log data memorized in the memory unit 46 is transmitted to the server device 30 together. Transmission of the reproduction log data may be performed at a timing when the reproduction by the reproduction software A is terminated.

However, the transmission of the reproduction log data by phrase to the server device 30 may be performed every time when detection of the reproduction time in one phrase is terminated.

Figure 4:
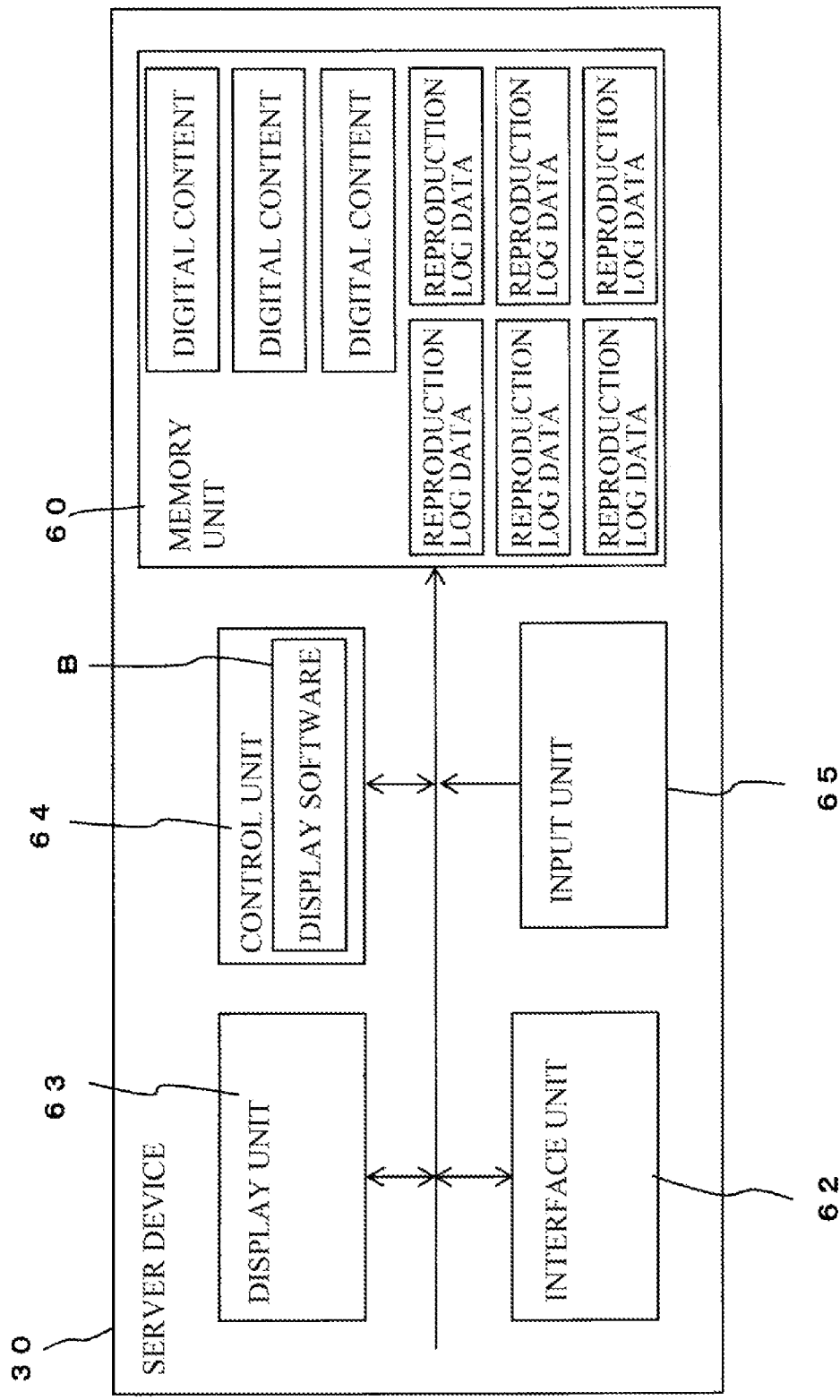
FIG. 4 is a block diagram illustrating an internal configuration of a server device.

A configuration of the server device 30 is illustrated in FIG. 4.

The server device 30 may employ a general computer (PC). The server device 30 includes a memory unit 60 including an HDD and the like in which the learning digital content is memorized, an interface unit 62 for connecting to the internet, a control unit 64 including a CPU, a memory and the like, a display unit 63 including a monitor and the like, and an input unit 65 including a mouse, a keyboard, and the like.

The above-described display unit 63 corresponds to a server display unit in claims, the above-described interface unit 62 corresponds to a receiver unit in claims, the above-described memory unit 60 corresponds to a digital content memory unit in claims, and the above-described control unit 64 executes display software described later to realize a display control unit in claims.

In the server device 30, the reproduction log data transmitted from the respective terminal devices 40 are received by the interface unit 62 and are memorized in the memory unit 60.

The control unit 64 of the server device 30 is capable of converting the reproduction log data memorized in the memory unit 60 (including at least ID information by phrase and reproduction start time by phrase) into time spent on reproduction by phrase and the number of times of reproduction by phrase, and causing the display unit 63 to display the converted time spent on reproduction by phrase and number of times of reproduction by phrase. In other words, a data conversion unit in claims corresponds to the control unit 64 which realizes a data conversion function.

Here, a configuration of the reproduction log data is illustrated in FIG. 5.

The reproduction log data to be generated by each of the respective terminal devices 40 includes times and dates when any operation buttons are operated, content of operation, states of the terminal device 40, titles, reproduction file names, phrase IDs, and text data of the corresponding phrases.

The control unit 64 calculates time spent on reproduction of each phrase based on the reproduction start time by phrase and the reproduction start times of the next phrase. The control unit 64 calculates the number of times of reproduction of each phrase based on the number of the same file names existing for each file name by phrase.

Display of times spent on reproduction of the respective phrases and the numbers of times of reproduction of the respective phrases calculated from the reproduction log data by the control unit 64 is executed by display software B memorized in the memory unit 60 in advance.

Figure 6:
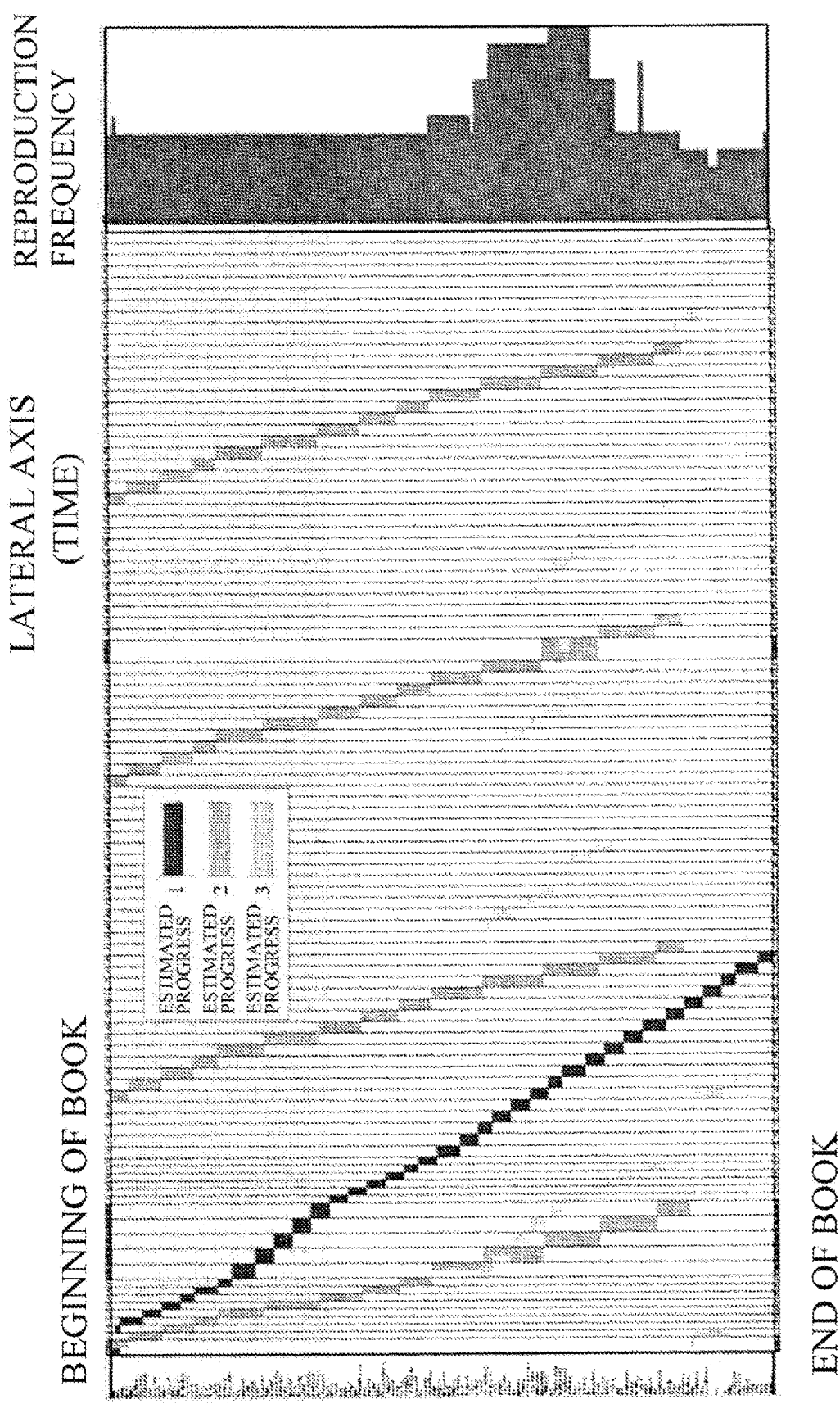
FIG. 6 is an explanatory drawing illustrating times spent on reproduction and numbers of times of reproduction at different reproduction times and dates.

FIG. 6 is a graph displayed on the display unit 63, and indicates the times spent on reproduction of the respective phrases and the numbers of times of reproduction of the respective phrases in the same terminal device for the same learning digital content at different times and dates of reproduction.

In this graph, a lateral axis represents time and a vertical axis indicates the learning digital content in which a text is divided into predetermined ranges (by phrase range) so that a beginning of the text comes to a top and an end of the text comes to a bottom. The numbers of times of reproduction are shown by a bar graph on a right side of the graph with the lateral axis representing the number of times of reproduction.

Specifically, in a column along the vertical axis, the text of the learning digital content is divided by phrase range, and the divided strings are displayed from the top in order. The times spent on reproduction corresponding to these phrases are indicated by the length of the squares along the lateral axis.

The colors of the squares indicating the times spent on reproduction corresponding to the respective phrases at different times and dates of reproduction are controlled to be different from each other so as to allow discrimination of the times and dates of reproduction. In this configuration, the times spent on reproduction according to the difference in time and date of reproduction can be figured out easily.

When focusing on an inclination of time spent on reproduction from the beginning of the text to the end of the text, the longer the reproduction time, the longer the entire graph extends in the lateral direction, correspondingly, so that the comprehension level and the achievement level of the student can be figured out by the inclination of the graph.

In other words, if the inclination of the graph is gentle, the longer reproduction time is needed, so that the comprehension level of the student may be determined to be low, and if the inclination of the graph is steep, the shorter reproduction time is sufficient so that the comprehension level of the student may be determined to be high.

By comparing the times spent on reproduction at different times and dates of reproduction, if the inclination of the graph becomes steeper as the time and date of reproduction go on, the operator of the server device 30 can determine that the comprehension level shows good progress.

When the inclination of the graph is relatively steep from the beginning, there is a case where the inclination of the graph does not change even when the time and date of reproduction go on. In such a case, it is assumed that the comprehension level is high from the beginning, and the improvement of the comprehension level could not achieved any longer. In such a case, settings may be changed to increase a reproduction speed of the learning digital content.

Note that points where the frequency of reproduction is high may be determined from the bar graph indicating the reproduction frequency on the right end of the graph, and points where the reproduction time is long may also be determined, so that points difficult to comprehend in the text for the student may easily be figured out.

As described thus far, the operator of the server device 30 (educator) may conduct tutorship which meets the corresponding student by watching time spent on reproduction at different times and dates.

Also, the operator of the server device 30 (educator) may set creating conditions used for creating the learning digital content for a learning process as described thus far. In other words, a unit of division of the content may be optimized depending on the achievement level of learning. For example, the unit of division of the content may be set to increase the number of characters from clauses, punctuation, and paragraph in this order every time when the achievement level is improved. Examples of other creating conditions used for creating the learning digital content include presence or absence of readings and the size of characters included in setting conditions.

An example in which the terminal device 40 itself displays as illustrated in FIG. 6 will be described.

A configuration of the terminal device 40 in this case is illustrated in FIG. 7. The same components as the components described above may be designated by the reference numerals, and description may be omitted.

The control unit 44 of the terminal device 40 converts the reproduction log data memorized in the memory unit 46 (including at least ID information by phrase and reproduction start time by phrase) into time spent on reproduction by phrase and number of times of reproduction by phrase.

Then, the control unit 44 executes the display software B so that the times spent on reproduction by phrase at different times and dates of reproduction and the numbers of times of reproduction by phrase may be displayed on the same display unit 41.

By the display software B being executed, for the times spent on reproduction by phrase and the numbers of times of reproduction by phrase at different times and dates of reproduction to be displayed on the display unit 41 the same content as the content illustrated in FIG. 6 is displayed.

In the embodiment described thus far, reproduction of the recorded voice data has been described. However, a TTS (Text To Speech) system that converts text data into voice data without having recorded voice data may also be employed. However, when the TTS system is employed, a control unit provided with a TTS function needs to be provided in the terminal device 40.

According to the embodiment described above, the times spent on reproduction by phrase and the numbers of times of reproduction by phrase at different times and dates of reproduction may be displayed on the same screen. Therefore, the operator of the server device 30 (educator) may determine problems relating to reading of each of the students by collectively watching whether reproduction has been made according to the progress of learning, whether a reproduction method meeting the difficulty in reading of each student was applied, whether there is unbalanced distribution of reading frequency, whether the right position of the text could be referenced when an examination was conducted, whether homework has been performed as instructed (a case where the terminal device is brought back home), whether there is a sign of improvement of comprehension level such as the reproduction speed is increased or the times of repetition is reduced in the latter half, and the like.

Then the educator or the like may proceeds to support based on improvements of setting conditions on voice reproduction and the operating method and the like.

Although various modes of the present invention have been described with a preferred embodiment, the present invention is not limited to this embodiment, and a number of modifications may be made without departing the spirit of the invention, as a matter of course.

What is claimed is:
1. An education support system comprising:
one or more terminal devices including:
a terminal display unit that displays text data of a digital content including text data and voice data created by reading out the text data; a voice output unit that outputs the voice data of the digital content by voice; a reproduction log data memory unit that memorizes at least ID information on phrases of the digital content reproduced by the terminal display unit and the voice output unit and reproduction start times of the phrases for each of the phrases as reproduction log data; and a transmission unit configured to transmit the reproduction log data memorized in the reproduction log data memory unit; and
a server device including:
a digital content memory unit in which one or more digital content to be distributed to each of the terminal devices are memorized; a receiver unit that receives the reproduction log data transmitted from each of the terminal devices; a data conversion unit that converts the reproduction log data of each of the terminal devices received by the receiver unit into times spent on reproduction and numbers of times of reproduction by phrase of the digital content; a server display unit that displays the times spent on reproduction and numbers of times of reproduction by phrase of the digital content converted by the data conversion unit; and a display control unit that causes the server display unit to display about times spent on reproduction and numbers of times of reproduction by phrase on the same terminal device for the same digital content with a plurality of sets of the times and the numbers of times of reproduction at different times and dates simultaneously on the same screen;
wherein the display control unit is configured to arrange strings of the phrases in the respective digital content in a vertical direction, indicate the times spent on reproduction of the strings of the phrases by a lateral length of squares shown on a right side of the respective strings arranged in the vertical direction, and control the lateral length of the squares to be displayed by different colors for each of reproduction times and dates; and wherein the display control unit is configured to control display so as to allow discrimination between reproduction with a voice output and reproduction without the voice output when indicating the times spent on reproduction of the strings of the phrases by the lateral length of the squares shown on the right side of the respective strings arranged in the vertical direction.

2. A terminal device comprising:

a display unit that displays text data of a digital content including text data and voice data created by reading out the text data;

a voice output unit that outputs the voice data of the digital content by voice;

a reproduction log data memory unit that memorizes at least ID information on phrases of the digital content reproduced by the display unit and the voice output unit and reproduction start times of the phrases for each of the phrases as reproduction log data; and a data conversion unit that converts the reproduction log data of the reproduction log data memory unit into times spent on reproduction and numbers of times of reproduction by phrase of the digital content; and a display control unit that arranges strings of phrases in the reproduction log data converted by the data conversion unit in a vertical direction, and causes times spent on reproduction of the strings of the phrases to be displayed with a plurality of sets of the times at different times and dates so as to be indicated by a lateral length of squares arranged on a right side of the respective strings simultaneously on the same screen;

wherein the display control unit is configured to arrange the strings of the phrases in the respective digital content in the vertical direction, indicate times spent on reproducing the strings of the phrases by the lateral length of the squares shown on the right side of the respective strings arranged in the vertical direction, and control the lateral length of the squares to be displayed by different colors for each of reproduction times and dates; and wherein the display control unit is configured to control display so as to allow discrimination between reproduction with a voice output and reproduction without the voice output when indicating the times spent on reproduction of the strings of the phrases with the lateral length of the squares arranged on the right side of the respective strings arranged in the vertical direction.

* * * * *